United States Patent

[11] 3,628,276

[72] Inventor Thomas E. Coalson
15182 Warwick Circle, Westminster, Calif. 92683
[21] Appl. No. 41,399
[22] Filed May 28, 1970
[45] Patented Dec. 21, 1971

[54] TWO-PIECE FISHING LURE
10 Claims, 9 Drawing Figs.
[52] U.S. Cl. ..................................... 43/42.09, 43/42.23, 43/42.36
[51] Int. Cl. .................................................. A01k 85/00
[50] Field of Search ........................................ 43/42.09, 42.08, 42.36, 42.23

[56] References Cited
UNITED STATES PATENTS
2,694,876 11/1954 Grasser ....................... 43/42.09
2,758,408 8/1956 Murphy et al. ............... 43/42.09
3,091,883 6/1963 Hufford ....................... 43/42.09 X Primary Examiner—Samuel Koren
Assistant Examiner—Daniel J. Leach
Attorney—Fowler, Knobbe & Martens ABSTRACT: A fishing lure having an elongate body, a resilient unitary carrier snap embedded longitudinally in the body and a removable hook carrier of flat resilient material snapped under the body, the hook carrier bearing a triple-shank, barbed hook. shaped ends of the carrier snap extend under the body forming shanks which are spread when passed through apertures in the hook carrier, the apertures being spaced apart a small distance greater then the distance between the shanks.

PATENTED DEC 21 1971 3,628,276

INVENTOR.
THOMAS E. COALSON
BY
FOWLER, KNOBBE
& MARTENS
ATTORNEYS.

INVENTOR.
THOMAS E. COALSON

BY
FOWLER, KNOBBE
& MARTENS
ATTORNEYS.

TWO-PIECE FISHING LURE

This invention relates to fishing lures which are trailed at the end of a line and more particularly to lures or artificial bait in which the body is removably attached to a hook-carrying member.

Since recreational fishing is a sport and not an art or science, at any given time on any given day a fisherman does not know what type of bait will attract the fish and cause them to bite. This uncertainty makes it necessary for fishermen to include a number of different type lures in their tackle box so they may be properly prepared. Each one of these lures normally has a set of hooks permanently attached. Generally, the dyed-in-the-wool fisherman ends up with a tackle box full of lures which are difficult to disconnect from each other because of the hooks becoming entangled. Often the fisherman desires to quickly change the lure, but cannot do so until he has untangled the one he desires. Keeping the lures separate requires a large, bulky tackle box.

Lures with separable hook-bearing members and bodies solve some of the problems associated with the permanent hook-bearing lures. The fisherman can carry less fishing tackle since a single hook-bearing member may be used with a plurality of body types. To change the lure, the fisherman need only unfasten the lure body from the hook carrier. Present separable lure devices bear several disadvantages. Some of the lures have the hooks permanently attached to the hook carrier while others require removable pins to hold the hook carrier to the body. Yet others fabricate a control surface, such as a bill to make the lure dive, on the body. This complicates the manufacture of the fishing lure and decreases any cost advantage attendant to having a replaceable body. In many of the lures, close manufacturing tolerances are required because the engaging portions on the body and the hook-carrying member must closely mate to effect locking. If through use the alignment is disturbed, there is a good possibility that the body will become detached from the hook-carrying member.

As described herein, the present invention includes a floatable, two-piece plastic lure body shaped to serve as a bait for fishing. A unitary carrier snap, formed from an elongate member of resilient material, is embedded in the lure body during its fabrication. In accordance with one aspect of the invention, the carrier snap has a pair of depending shanks which project under the lure body intermediate its ends. The forward, or front, shank is rigidly held with its lower end terminating in a rearward-facing finger. The rear shank is held so as to be capable of being spread apart from the front shank and terminates in a ring which lies in the same plane as the rearward-facing finger. In accordance with a second aspect of the invention, a hook carrier is formed from flat resilient material and has a pair of apertures spaced apart by a distance slightly greater than that between the shanks of the carrier snap. The front aperture is round for engagement with the finger of the carrier snap and the rear aperture is elongate to accept the ring portion of the rear shank.

The hook carrier is attached under the lure body by first passing the finger of the front shank through the front aperture of the hook carrier. Then, the front edge of the rear aperture is engaged with the lower edge of the ring on the rear shank. As the rear of the hook carrier is forced toward the lure body, it rides up the ring, flexing the rear shank backwards and slightly bowing the hook carrier. The front aperture remains engaged with the front shank and the front edge of the rear aperture resides against the rear shank, with the bottom of the hook carrier resting on the top of the ring. In this improved fishing lure, the manufacturing tolerances during fabrication need not be as close as in prior devices since the snapping action results from the compression of the carrier snap against the extension of the hook carrier. This relative motion insures that positive engagement occurs even with some variance in measurements of the parts from nominal. Additionally, because of the positive engagement, the body is not likely to be disengaged by shock experienced during rugged use. It is an advantage that, while the body and the hook carrier are firmly held together during use, they may be readily separated by sharply pulling the rear of the hook carrier away from the lure body in reverse of the attaching procedure.

The hook carrier, which is made of a single piece of material, has a forward-facing, downwardly pointing bill which is apertured to receive a swivel snap for attaching at the end of a fishing line. The bill acts to force the lure to dive under the water. The center portion of the hook carrier has a pair of elongate wings which spread downwardly and point to the rear. These wings limit the extent of side-to-side wobble of the lure body to make the lure dart in a lifelike manner. The rear portion of the hook carrier terminates in a downwardly curved tail having a hole through which a triple-shank, barbed hook is inserted. The hook has one shank free to flex outwardly from the other rigidly fixed shanks so as to allow passing the flexed shank through the hole in the hook carrier.

In summary, the fishing lure of the present invention has a lure body of which the carrier snap is an integral part. The hook carrier which is attached under the lure body is made of a single piece of flat springy material to which the hooks and swivel snap may be readily attached; no other hardware is required. The simple construction results in a relatively inexpensive fishing lure in which the lure body may be quickly detached from the hook carrier and another body immediately substituted with a minimum of effort. Fabrication of the few parts required is simple because the parts may be stamped and molded with presently available machines.

The invention may be more clearly understood from the following detailed description when taken in conjunction with the appended claims and the accompanying drawings wherein:

DETAILED DESCRIPTION

Figure 1:
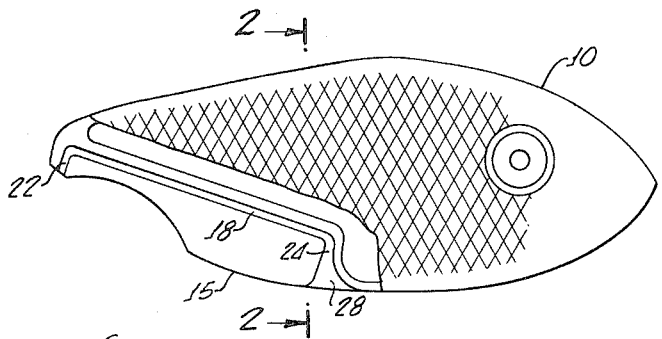
FIG. 1 shows a lure body with a portion cut away to expose the carrier snap passage.

Referring now to FIG. 1, there is shown a lure body 10 in the shape of a commonly known bait, in this case a small minnow. The lure body 10 is attached to a hook carrier (described below) and trailed through the water. Experience has shown that this body shape acts in a manner more desirable to fish when pulled in a reverse position. Therefore in this embodiment, the tail portion of the body (at the left end of FIG. 1) is at the front of the lure and will be so referenced.

Figure 2:
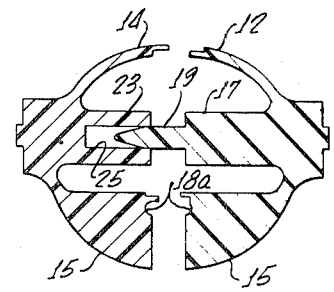
FIG. 2 shows a cross section essentially on the line 2—2 of FIG. 1.

The body 10 may be formed from any floatable material, for instance, wood or plastic. In the preferred embodiment, the body 10 is made of rigid plastic molded into two interlocking halves 12 and 14, shown in FIG. 2. The first half 12 has a tongue 17 extending horizontally from its wall and terminating in a pin 19. Extending horizontally from the wall of the second half 14 is a knob 23 having a recess 25. The pin 19 engages the recess 25 providing guide means for registering the halves when they are placed together. The two halves are bonded together by cementing the contact surfaces or by using known ultrasonic welding techniques.

Each of the halves 12 and 14 is essentially hollow except for a solid belly portion 15 in the lower fronts. As described below, when the two halves are placed together a carrier snap 16 (shown in FIG. 3) is embedded in the body 10. To this end, in the belly portion 15 of each half is formed a groove 18a, which is U-shaped in longitudinal cross section and semicircular in transverse cross section. When the halves 12 and 14 are mated, a U-shaped passage 18 of circular cross section is formed through the body 10. The passage 18 is of substantially the same diameter as the carrier snap 16 to accommodate the snap longitudinally within the body 10. The front end of the passage 18 terminates in a downwardly extending leg 22 which exits on the bottom of the lure body 10. The leg 22 is of the same diameter as the passage 18. The rear end of the passage 18 terminates in a rear leg 24 which also extends downwardly and exits under the lure body 10. The front edge of the leg 24 is essentially perpendicular to the longitudinal portion of the passage 18, but the rear part of the leg 24 is shaped to curve backwardly creating a small half-cone-shaped opening 28.

Figure 3:
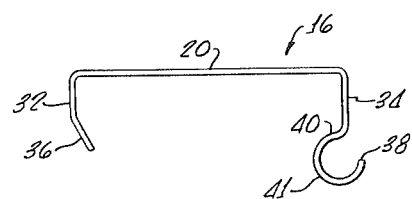
FIG. 3 is a side view of the carrier snap.

The carrier snap 16 of FIG. 3 is shaped to lie within the passage 18 and engage the hook carrier later described. During engagement, one end of the carrier snap 16 is flexed, this being made possible by making the carrier snap of resilient material, in this case a length of wire. The carrier snap 16 has a straight backbone portion 20 which terminates at one end in a perpendicular front shank 32 and at the other end in a perpendicular rear shank 34. While in the preferred embodiment, the backbone 20 makes the snap 16 unitary, each of the shanks can be fabricated separately. Provision could be made to insure the shanks remain in the body, for instance, by providing each of the shanks with a stub portion of the backbone 20. The front shank 32 terminates in a rearward facing finger 36 and the rear shank 34 terminates in a ring 38. While the ring 38 may encompass 360° to close upon itself, the open portion comprises approximately one-quarter of the circumference of the ring which faces to the rear. The portion of the ring 38 which is open is not critical but should be large enough so that the fishing line cannot become caught. The forward portion of the ring 38 forms a round camming surface 41 upon which the carrier rides into a locked position adjacent the forward shoulder 40 at the top of the ring 38.

Figure 4:
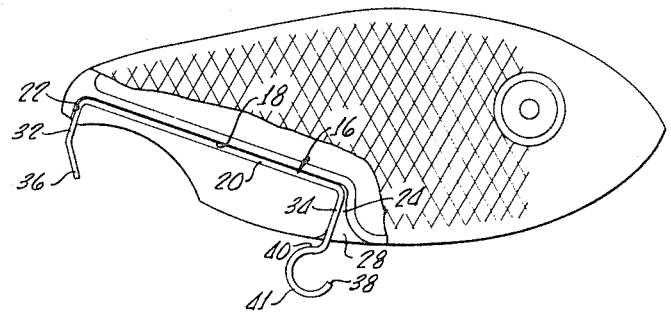
FIG. 4 shows the lure of FIG. 1, with the carrier snap of FIG. 3 in place.

Referring to FIG. 4, the snap 16 is placed in the body during assembly of the first half 12 with the second half 14, the backbone 20 lying in the passage 18. The snap 16 then becomes an integral part of the body 10. As can be seen from FIG. 4, the front shank 32 is held rigidly within the front leg 22 with the finger 36 extending rearward at a small angle. The rear shank 34 of the carrier snap 16 extends through the rear leg 24, with the ring 38 depending below the body 10. The shoulder 40 is then adjacent to the bottom of the body 10, while the camming surface 41 extends below with the open part of the ring extending backward. The shank 34 contacts the front edge of the rear leg 24 but is free to flex backwardly into the cone-shaped opening 28 when the eye 38 comes into engagement with the hook carrier as described below.

Figure 5:
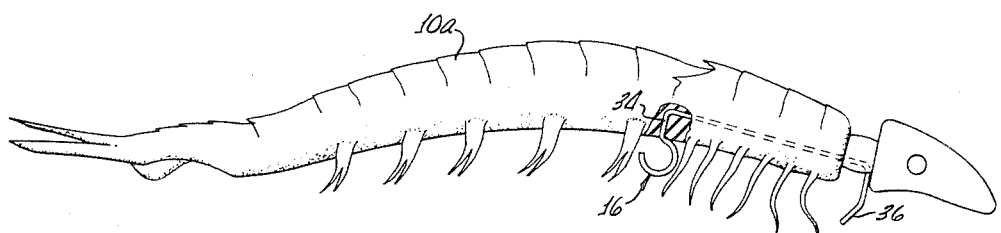
FIG. 5 shows a carrier snap embedded in a flexible body.

While in the preferred embodiment the carrier snap 16 is fitted within the rigid plastic body 10, the snap may also be used in a flexible body. Referring to Fig. 5, the body 10a is made of rubbery vinyl plastic, with the carrier snap 16 being formed as an integral part. In this embodiment, the snap 16 is unitary and is placed in the body mold along with the plastic. The body is then cured to the desired shape, with the carrier snap 16 firmly embedded. Specially shaped openings are not required because, due to the inherent resilience of the vinyl plastic, the body will flex with the shank 34.

One of the objects of the invention is to provide a lure in which the body and hook-carrying member remain rigidly fixed together during use, but which may be separated when desired with a minumum of time and effort. To this end, and in accordance with an aspect of the invention, a hook carrier 42 (shown in FIG. 6) is made of a springy material, such as stainless steel or plastic, which will flex during attaching and detaching. Near the front of the hook carrier 42 is a round aperture 44 large enough to accommodate the finger 36 extending below the body 10. Just back of the center of the carrier is a second aperture 45 which is elongate in order to accept passage of the ring 38. For reasons which will become apparent, the spacing between these apertures is slightly greater than the distance between the shanks of the carrier snap 16.

Figure 6:
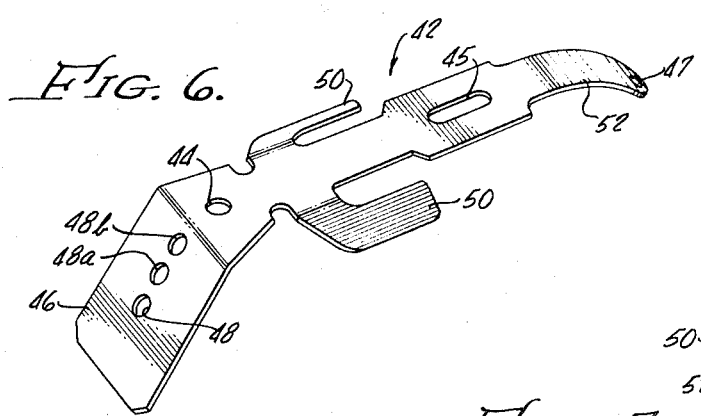
FIG. 6 is a perspective view of the hook carrier.
Figure 7:
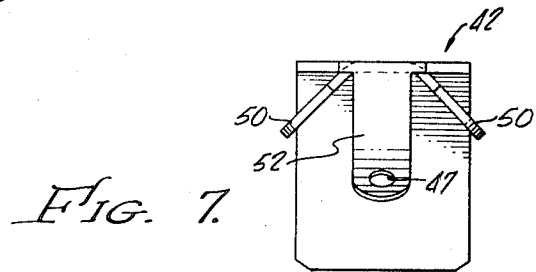
FIG. 7 is a rear end view of the hook carrier.

The forward portion of the hook carrier 42 is a downwardly pointing bill 46 which aids in the desired action of the lure. A series of three holes 48, 48a, and 48b are drilled in the bill to accommodate attaching the hook carrier to a fishing line. The center portion of the carrier body has a pair of downwardly spreading wings 50 which face to the rear, as shown in FIGS. 6 and 7. The purpose of the wings is to stabilize movement of the lure. Behind the elongate aperture 45 is a downwardly curving tail 52 which has a hole 47 drilled to accept a suitable fishhook.

Figure 8:
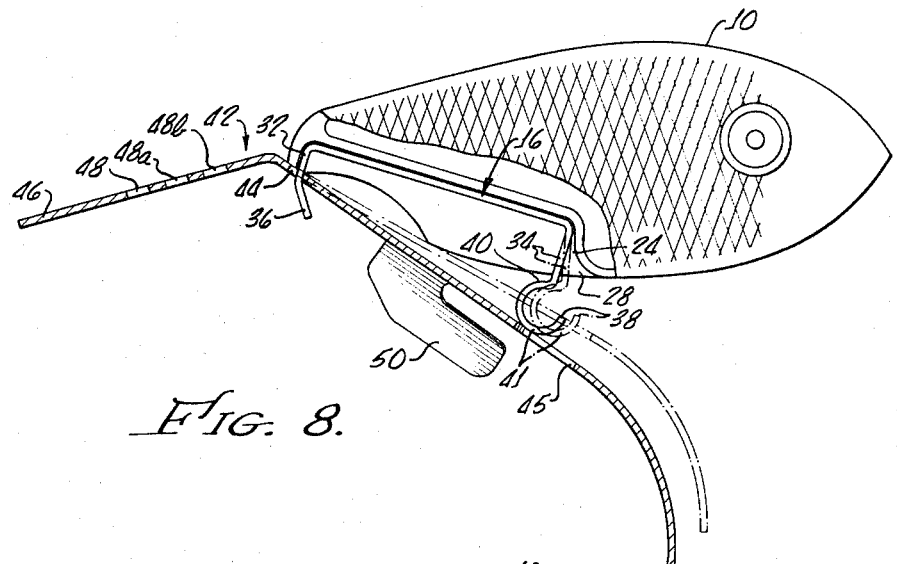
FIG. 8 is a view of the hook carrier during installation.
Figure 9:
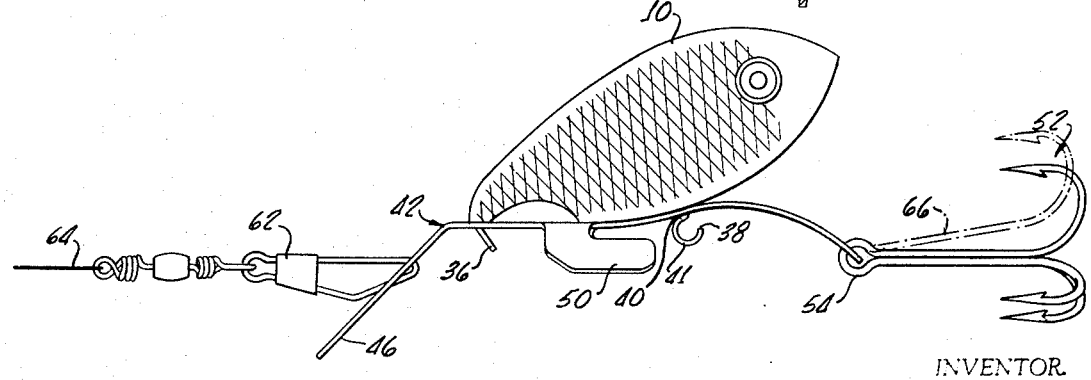
FIG. 9 shows the hook carrier in the installed position.

In use, the hook carrier 42 is readily attached to the body 10. This is best accomplished, for example, by grasping the body 10 with one hand and the hook carrier 42 in the other hand. The finger 36 is inserted in the forward aperture 44 so the hook carrier 42 resides against the front shank 32 adjacent to the bottom of the lure body 10. The rear portion of the hook carrier 42 is then pivoted up to contact the bottom of the ring 38 as shown by the solid lines of FIG. 8. At this point, the forward edge of the elongate aperture 45 resides on the lower edge of the camming surface 41. The hook carrier 42 is engaged under the body 10 by pressing upward on the hook carrier between the wings 50. The front edge of the aperture 45 rides up to an intermediate position on the camming surface 41 of the ring 38, as shown by the dotted lines of FIG. 8. As the hook carrier 42 rides up the ring 38, the rear shank 34 is resiliently spread away from the front shank 32 and back into the cone-shaped opening 28. In addition, the forward pressure exerted on the front edge of aperture 45 by the camming surface 41 bows the ends of the hook carrier slightly toward the body. This shortens the spacing between the apertures which is initially greater than the distance between the shanks. The hook carrier 42 comes to rest against the bottom of the body 10, with the front of the aperture 45 residing firmly against the shank 34 and the bottom of the hook carrier resting on the front shoulder 40. The hook carrier 42 is shown in FIG. 9 snapped in place under the body. The carrier 42 remains tightly abutted against the body 10 because the carrier snap shank 34 having been spread backward acts in compression against the front of aperture 45. This squeezes the hook carrier 42 between the front shank 32 and the rear shank 34. The hook carrier 42, having been slightly bowed, tries to straighten itself and thereby exerts a force against the shanks. The finger 36 of the front shank 32 and the ring 38 resist any downward movement of the carrier 42. Since the hook carrier 42 and the carrier snap 16 both move relative to each other during the snapping operation, the manufacturing tolerances are less critical. For instance, unless the spacing between the shanks 32 and 34 was too far off nominal, the spacing between the apertures 44 and 45 may vary slightly and positive attachment will still occur. It is an advantage to fabricate the carrier snap 16 and the hook carrier 42 from resilient materials, but positive locking may still be achieved if only one of them is resilient. For instance, if the hook carrier 42 is rigid then the compression of the shanks of the carrier snap 16 will hold the lure body 10 and the hook carrier together.

To make the lure ready for fishing use, a suitable hook is attached to the hook carrier 42. The hook normally used with these lures is that which is referred to by fishermen as a triple-shank, barbed hook. The construction of these hooks is well known and will not be explained here. In the present embodiment, the hook is inserted through the hole 47 in the tail of the hook carrier 42. To this end, a modified triple-shank, barbed hook 52 is used. As shown in FIG. 9, the hook 52 has a shank 66 free to flex outwardly from the other rigidly fixed shanks. To install the modified hook 52 in the hook carrier 42, the barb with the loose shank 66 is inserted through the hole 47 and the shank is flexed outwardly (as shown by the dotted lines of FIG. 9) to pass the hook onto the hook carrier 42 so the eye 54 engages the hole 47. The flexed shank 66 is then released and returns to its normal position wherein all three shanks lie adjacent to each other as shown by the solid hook in FIG. 9.

Rigging of the lure is completed by inserting a swivel snap 62 through any two of the holes 48, 48a, and 48b (see FIG. 6). Passing the swivel snap 62 through holes 48 and 48a causes the lure to trail differently than it would if the holes 48a and 48b were used and also changes the diving characteristics of the lure. A fish line 64 is attached to the forward end of the swivel 62 to facilitate drawing the lure through the water.

In use, when the lure is trailed through the water, the bill 46 is inclined at an angle to the pull of the line and causes the lure to dive under the water. The wings 50 along the center of the hook carrier 42 act as stabilizing planes and shorten any side-to-side excursions, making them sharp and short so the body appears as though it is a live darting object. As stated above, the body in the preferred embodiment is reversed because experience has shown this lure has more desirable action in the water when so trailed. Other bodies may be placed on the hook carrier 42 so they are pulled in the forward direction. The compression of the carrier snap against the extension of the hook carrier insures that the two will be firmly attached together even if the lure is thrown against a rock or somehow exposed to a jarring blow.

If use of the lure is not successful in catching fish and the fisherman desires to change the bait, the lure body 10 is quickly taken off the hook carrier 42. By simply reversing the installation procedure described above, the rear elongate aperture 45 is pulled out of engagement with the shoulder 40, separating the body and the carrier. A second body is then installed by snapping it in place on the hook carrier.

The invention has been disclosed in the form of a carrier snap whose shanks are spaced apart by a distance slightly smaller than that between a pair of openings in an associated hook carrier. This has the effect of flexing the carrier snap shanks apart when they are inserted into the openings and, if the hook carrier is sufficiently flexible, of bowing the latter. However, if desired, the carrier snap shanks may also be spaced apart by a distance which is slightly greater than the distance between the openings in the hook carrier, in which case the shanks will be flexed toward one another upon insertion into the openings. In the latter case, the hook carrier will be put in tension and there will be no tendency for it to bow.

What is claimed is:
1. A fishing lure comprising:
   a. a lure body;
   b. a carrier snap embedded in said lure body and including a pair of shanks projecting from said body, with the shanks being capable of being flexed;
   c. a hook carrier having a flat body in which there are a pair of apertures spaced apart by a distance which is slightly different than the distance between said shanks so that the shanks are flexed when passed through said apertures; and
   d. means on said hook carrier for receiving a hook.

2. The lure of claim 1 wherein said carrier snap is a unitary member having a backbone portion connecting the shanks.

3. The lure of claim 1 wherein the shanks of said carrier snap extend downward in the same plane under said body, the forward shank terminating in a rearward-angled finger and the rear shank terminating in a ring, the forward shank being passed through the forward aperture of said hook carrier to act as a pivot while the rear shank is being passed through the rear aperture as said carrier is cammed up the ring to engage the rear shank at a point adjacent to the top of the ring.

4. The lure of claim 3 wherein the front aperture of said hook carrier is round so as to allow passage of the finger of said front shank and the rear aperture is elongate to allow passage of the ring of said rear shank.

5. The lure of claim 1 wherein said hook carrier is made of resilient material so that its ends bow toward said body when the shanks are passed through the apertures.

6. The lure of claim 1 wherein the hook received by said hook-receiving means has a plurality of shafts, one shaft being free to flex away from the other rigidly joined shafts so as to allow the single shaft to be passed through said hook-receiving means.

7. The lure of claim 2 wherein said lure body is made of a flexible material.

8. A fish lure comprising:
   a. a lure body;
   b. a unitary carrier snap of resilient material embedded in said lure body, including a pair of shanks connected by a backbone member inside said body, the shanks projecting flexibly from said body; and
   c. a hook carrier made of a flat resilient material having a pair of apertures dimensioned to accept the shanks of said carrier snap and spaced apart a distance greater than the distance between the shanks so that when the shanks are pressed through said apertures, said hook carrier is bowed slightly, said hook carrier additionally including:
      1. a downward-angled front bill portion to make the lure dive,
      2. a pair of wings attached to the center portion of said hook carrier to stabilize its motion, and
      3. a tail portion having means for receiving a hook.

9. A fishing lure of the type which is pulled through the water comprising:
   a. a rubbery lure body;
   b. a unitary carrier snap of springy material integrally molded in said lure body and including a pair of shanks connected by a backbone member inside said body, the shanks projecting from said body; and
   c. a hook carrier made of a flat springy material having a pair of apertures dimensioned to accept the shanks of said carrier snap wherein the apertures are spaced apart a distance greater then the distance between the shanks so that when the shanks are spread by passing them through the apertures, said hook carrier is bowed at its ends toward said body, said hook carrier additionally comprising:
      1. a downward-angled front bill portion to effect diving of the lure as it is pulled through the water,
      2. a pair of wings attached to the center portion of said hook carrier to stabilize its motion as it is pulled through the water, and
      3. a tail portion having means for receiving a hook.

10. A fish lure comprising a lure body, a resilient carrier snap embedded in said body and a hook carrier of resilient material snapped under said body, the carrier snap having a pair of shanks projecting from said body and being capable of being resiliently spread apart, the hook carrier having a pair of apertures spaced apart by a small distance greater than the distance between the shanks so that when the shanks are spread by passing them through the apertures, said hook carrier is bowed slightly at its ends toward said body so as to be snapped in place, the snapping feature residing in the straightening of said hook carrier against the compression of said carrier snap to hold said hook carrier firmly in place.

* * * * *